(12) United States Patent
Schmitt

(10) Patent No.: US 9,404,404 B2
(45) Date of Patent: Aug. 2, 2016

(54) HEAT EXCHANGER FOR A METERING UNIT OF AN SCR EXHAUST-GAS AFTERTREATMENT DEVICE

(71) Applicant: Cummins Ltd., Staines, Middlesex (GB)

(72) Inventor: Johannes Schmitt, Freudenstadt (DE)

(73) Assignee: Cuumins Ltd., Staines, Middlesex (GB)

(*) Notice: Subject to any disclaimer, the term of this patent is extended or adjusted under 35 U.S.C. 154(b) by 92 days.

(21) Appl. No.: 14/345,714

(22) PCT Filed: Sep. 19, 2012

(86) PCT No.: PCT/EP2012/003904
§ 371 (c)(1),
(2) Date: Jan. 7, 2015

(87) PCT Pub. No.: WO2013/041218
PCT Pub. Date: Mar. 28, 2013

(65) Prior Publication Data
US 2015/0128575 A1    May 14, 2015

(30) Foreign Application Priority Data

Sep. 19, 2011  (DE) .......................... 10 2011 053 742

(51) Int. Cl.
*F01N 3/00* (2006.01)
*F01N 3/02* (2006.01)
*F01N 3/20* (2006.01)

(52) U.S. Cl.
CPC ............ *F01N 3/0205* (2013.01); *F01N 3/2066* (2013.01); *F01N 2240/02* (2013.01);
(Continued)

(58) Field of Classification Search
USPC ........... 60/286, 289, 295, 297, 298, 301, 303, 60/320
See application file for complete search history.

(56) References Cited

U.S. PATENT DOCUMENTS

| 5,605,042 A * | 2/1997 | Stutzenberger .... B01D 53/9431 60/286 |
| 6,192,677 B1 * | 2/2001 | Tost ................... B01D 53/9431 60/286 |

(Continued)

FOREIGN PATENT DOCUMENTS

| DE | 19856366 C1 | 4/2000 |
| EP | 2105592 A1 | 9/2009 |

OTHER PUBLICATIONS

International Search Report, PCT/EP2012/003904, ISA/EP, Cummins LTD, Dec. 3, 2012. (3 pgs.).

(Continued)

*Primary Examiner* — Binh Q Tran
(74) *Attorney, Agent, or Firm* — Tat Stettinius & Hollister LLP

(57) ABSTRACT

The invention relates to a heat exchanger (50) for a dosing unit of an SCR (selective catalytic reduction) exhaust gas treatment device (10), wherein an adjustable volume of a fluid can be discharged by a dosing unit into an exhaust gas system (177) of an internal combustion engine (155). The heat exchanger (50) has at least one fluid channel (52) through which air can flow, wherein said fluid channel (52) is routed around at least a subregion of an outer peripheral wall (54) of a dosing valve (34) of the dosing unit (100).
In a further aspect, the invention relates to an SCR dosing unit (100) having a heat exchanger (50) according to the invention, wherein an air intake system (78) is arranged on the dosing unit (100), such that it is possible for air to be conveyed into the heat exchanger (50) during operation of the internal combustion engine (155). Finally, an exhaust gas treatment device (10) for an internal combustion engine (155) is suggested which is particularly suited for a vehicle engine, and preferably a diesel engine, and which has a dosing unit according to the invention.

20 Claims, 5 Drawing Sheets

(52) U.S. Cl.
CPC ..... *F01N2260/022* (2013.01); *F01N 2260/024* (2013.01); *F01N 2610/10* (2013.01); *F01N 2610/11* (2013.01); *F01N 2610/1453* (2013.01); *Y02T 10/24* (2013.01)

(56) References Cited

U.S. PATENT DOCUMENTS

| | | | | |
|---|---|---|---|---|
| 6,513,323 | B1 * | 2/2003 | Weigl | B01D 53/9431 137/340 |
| 6,539,708 | B1 * | 4/2003 | Hofmann | B01D 53/8631 239/132.3 |
| 7,497,077 | B2 * | 3/2009 | Dodge | F01N 3/2066 239/406 |
| 7,614,213 | B2 * | 11/2009 | Hirata | F01N 3/208 60/277 |
| 8,622,316 | B2 * | 1/2014 | Haeberer | F01N 3/2066 239/132.3 |

OTHER PUBLICATIONS

English Translation of the International Search Report, PCT/EP2012/003904, ISA/EP, Cummins LTD, Dec. 3, 2012. (2 pgs.).

* cited by examiner

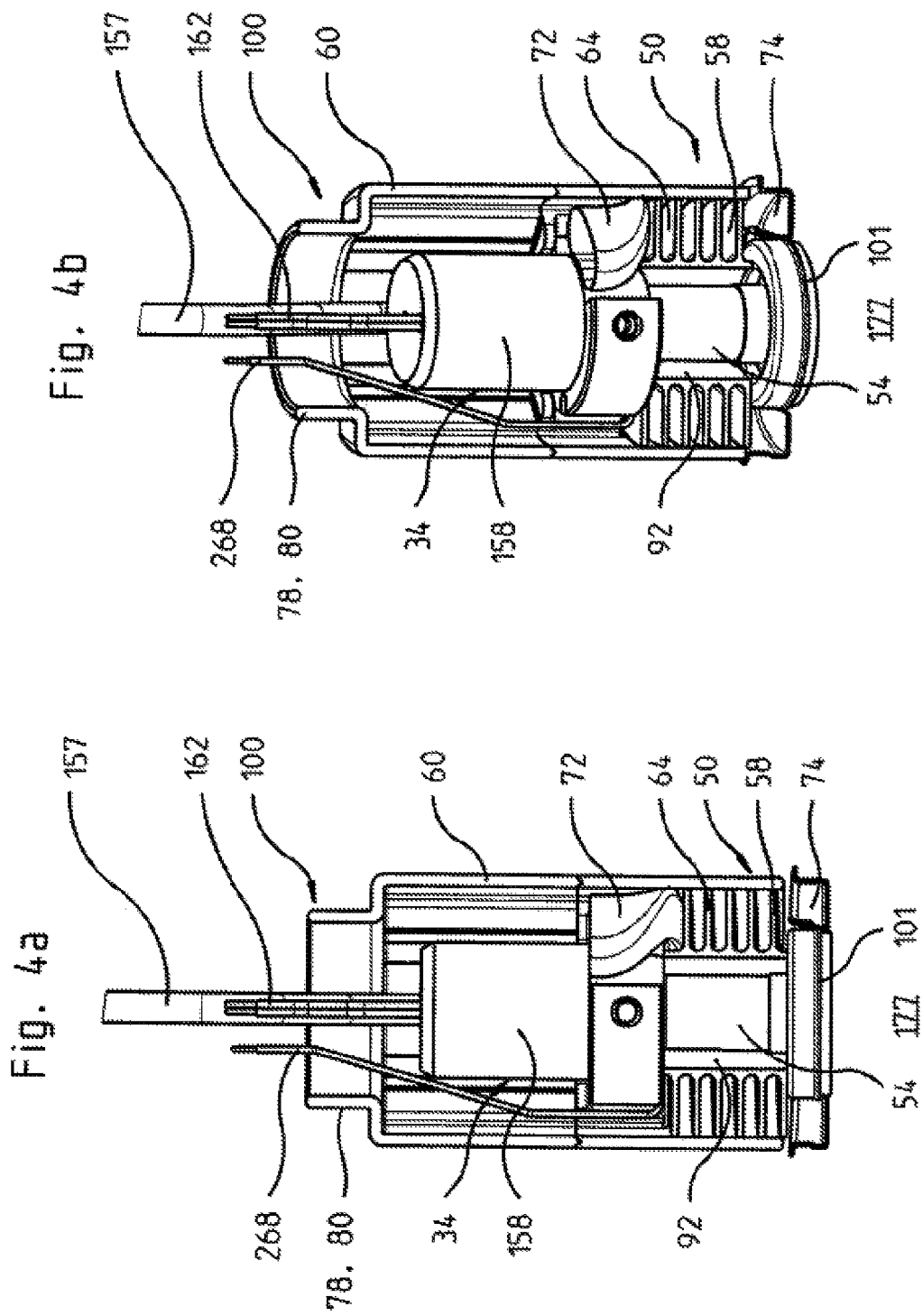

HEAT EXCHANGER FOR A METERING UNIT OF AN SCR EXHAUST-GAS AFTERTREATMENT DEVICE

PRIOR ART

The invention relates to an air heat exchanger for a dosing unit of an SCR exhaust gas treatment device. In addition, the invention relates to a dosing unit and to an exhaust gas treatment device having such an air heat exchanger.

In modern combustion engines, particularly in diesel engines, high demands are made for the reduction of the exhaust gas, particularly for the reduction of $NO_x$ emissions. The SCR exhaust gas treatment process (selective catalytic reduction) has become the most common process used for this purpose, wherein an aqueous urea solution is injected into the exhaust gas of an internal combustion engine, wherein the same can be a diesel engine or a gasoline engine. The nitrogen emissions of the internal combustion engine can be significantly reduced by a downstream SCR catalyst with the addition of an aqueous solution of urea (AUS). Because the dosing unit, particularly the dosing nozzle, is arranged in the exhaust gas flow, and accordingly is exposed to a higher thermal load, it is necessary for the temperature of the dosing unit as a component to be stabilized, to increase the service life thereof, and to provide precise dosing. At excessively high component temperatures, there is a risk of failure of the dosing unit, and/or the dosing of an imprecise volume of AUS, such that the exhaust gas treatment does not proceed effectively.

The practice of controlling the temperature of a dosing unit by means of a cooling fluid circulation is known in the prior art, wherein AUS is particularly used as the cooling agent. Accordingly, a closed and fluid-tight AUS cooling circulation is required, wherein a volume of AUS which is large in comparison to the injected AUS flows around the dosing unit and/or through the dosing unit in order to achieve a cooling. An exhaust gas treatment device according to the class is illustrated in DE 10 2008 012 780 A1, by way of example, having a dosing unit, wherein an AUS cooling circulation is used for the purpose of cooling the dosing unit, and an AUS substream circulates around at least a portion of a dosing unit, in a cooling channel.

DE 10 2008 012 780 A suggests an AUS heat exchanger for a dosing valve, having spiral windings. AUS is conveyed into the heat exchanger via a feed line, and is carried away via an outlet line. A second air-cooled heat exchanger is included in the AUS cooling circulation, outside of the dosing unit, and is cooled by external air or airflow from a ventilator fan, controlling the temperature of the warmed AUS fluid stream. For this purpose, it is necessary to configure a closed AUS cooling circulation, which leads to a significant increase in the complexity of the cooling process, and makes it difficult to choose a constructive design of the dosing unit, due to the fact that the AUS feed and outlet lines, as well as an additional heat exchanger, must be incorporated. In addition, AUS has extremely good penetrating properties and corrosively attacks seals and various other materials. For this reason, it is only possible to use highly specialized seals in the cooling circulation, and a leak can very quickly lead to failure of the cooling circulation, and therefore to damage of the exhaust gas treatment device, as a result of the high corrosive potential of the AUS fluid. Two factors discourage the use of AUS as a cooling agent. The first is the high freezing point of $-11°$ C., such that there is a risk of the cooling circulation freezing, particularly in winter, and therefore of damage to the exhaust gas treatment device. Secondly, AUS is extremely aggressive as a corrosive of various materials, such that seals and cooling channels must be made of stainless steel or approved plastic. AUS, which is also called AdBlue, and consists of a clear, synthetically manufactured, 32.5% solution of highly pure urea in demineralized water, should not be exposed to direct sunlight, and should be stored at a temperature between $-5°$ C. and $20°$ C. If the temperature is increased to more than $30°$ C., AUS can lose its advantageous properties, such that AUS is fundamentally unsuitable as a cooling agent. Finally, particularly in periods of high load on the engine, wherein up to 8 or 9 kg of AUS must be injected into the exhaust gas flow per hour, by way of example, and also due to the fact that the capacity of an AUS pump is limited, there is a risk that the available AUS cooling flow, particularly during high-load operation, will not be sufficient, such that the dosing unit will exceed a critical temperature.

A liquid-cooled dosing unit is also known in the prior art—for example from DE 10 2009 004 944 A1, wherein cooling fluid, such as condensation water from a vehicle, rain water, or windshield washer fluid, is dripped onto cooling fins of a dosing unit. In this case as well, there is the disadvantage that, first, it is necessary to provide a large amount of cooling fluid, and also the cooling system is highly complex due to the fluid-tight design. In addition, there is a risk of the dosing unit overheating when the re-supply of fluid fails.

Proceeding from the disadvantages of the prior art as illustrated above, the problem addressed by the invention is that of providing a temperature control device for a dosing unit, which provides a sufficient cooling without using a closed cooling fluid circulation, is fail-proof, can be integrated into existing dosing units with little constructive effort, and ensures an efficient cooling of a dosing unit and/or the dosing valve of an exhaust gas treatment device, particularly during high-load operation of the engine. In addition, the dosing unit should achieve a rapid defrosting effect at low temperatures, particularly below the freezing point of the AUS, in order to enable an efficient exhaust gas treatment during the engine starting phase in cold seasons.

This problem is addressed by a heat exchanger according to claim 1, and by a dosing unit and an exhaust gas treatment device according to the other independent claims. Advantageous embodiments of the invention are the subject matter of the dependent claims.

DISCLOSURE OF THE INVENTION

According to a first aspect according to the invention, a heat exchanger is suggested for a dosing unit of an SCR exhaust gas treatment device (selective catalytic reduction), wherein it is possible to discharge an adjustable amount of a fluid into an exhaust gas system of an internal combustion engine. The internal combustion engine can be a gasoline or diesel engine. The internal combustion engine is preferably a drive engine of a vehicle, particularly a passenger vehicle or commercial truck. The heat exchanger has at least one fluid channel through which air can flow, said fluid channel being routed at least around a subregion of an outer peripheral wall of a dosing valve of a dosing unit. As such, the invention suggests a heat exchanger wherein an air stream can flow through a fluid channel, and the fluid channel is routed around a subregion of the surface, and preferably around the entire surface, of a dosing valve of a dosing unit, for the purpose of cooling and/or heating.

The dosing valve is arranged upstream of a catalytic converter in the exhaust gas system of an internal combustion engine, and discharges AUS in dosed amounts into the exhaust gas system, to perform an SCR—i.e. a selective catalytic reduction—for the purpose of reducing nitrogen oxides in the exhaust gas. Due to the elevated thermal load, the heat exchanger provides a cooling flow and/or heating flow which at least cools and/or heats the dosing valve to below a critical operating temperature. In this way, the service life of the dosing valve is increased, and a desired dosing of AUS is ensured. The air stream can be a vehicle airflow supplied via an air intake system, or outflow air supplied from an air conditioner, and can be supplied both passively and actively—for example blown into the heat exchanger by fans or air compressors. It can also be contemplated that a substream of, or the entire air stream of, a turbocharger is diverted for the purpose of temperature control. The heat exchanger can be designed in the form of a hollow cylinder or a cylinder with heat exchanging fins, by way of example. Therefore, it serves the purpose of cooling when the exhaust gas system is hot, and of warming and/or defrosting the dosing unit when the weather is cold. As a result, it is a heater or a cooling device for the dosing unit, according to requirements.

The arrangement and shape of the fluid channel can be chosen in principle as any arbitrary design. According to one advantageous design of the heat exchanger, the fluid channel can be routed around the outer peripheral wall of the dosing valve with a helical shape, and preferably has three or more windings. As such, the fluid channel can be arranged around the outer peripheral wall of the dosing valve in the form of a screw winding, such that the air flow sweeps tangentially to the outer peripheral wall, which is typically cylindrical, in order to flow over the greatest possible heat transmission surface. The air stream is directed along an extended path around the outer peripheral wall, and can therefore receive a high amount of heat energy of the dosing valve and release the same to the air. Empirical studies have shown that it is possible to achieve up to 30% greater heat transmission performance, due to the large contact surface area compared to a simple flow of air. In contrast to cooling by solid conduction or liquid cooling, the air cooling and/or heating can be freely dosed, does not make high demands for the sealing of the heat exchanger system, and, particularly at high engine loads, it is possible to provide a high air flow which can be varied according to the driving speed, the performance of an air conditioner, or a rotation speed output of the engine, by way of example. The air stream cools and/or heats particularly the dosing valve and the dosing magnet, such that it is possible to precisely adjust a release of a predefined volume of AUS into the exhaust gas flow according to the load curve of the internal combustion engine.

The heat exchanger can be designed in principle as a single piece. According to a further advantageous design of the invention, the heat exchanger can have a multi-part design— particularly in two parts—wherein a first inner heat exchanger part has a heat conductive hollow cylinder for receiving the dosing unit being cooled and/or heated, and a surrounding, heat conductive fin which is routed around the outer shell of the hollow cylinder, projecting radially from the same, and preferably as a spiral fin with a helical shape. A second outer, and cylinder- or bowl-shaped, heat exchanger part can be pushed or screwed over the outer periphery of the fin, forming an outer wall of the fluid channel with a flush fit, such that the volume between the fin surface and the outer cylinder surface of the first heat exchanger part and the inner surface of the second heat exchanger part defines the fluid channel. As such, this embodiment suggests a two-part heat exchanger which consists of an inner hollow cylinder, the outer wall of which has a spiral fin, for example, and which can be pushed over the region of the dosing unit being cooled or heated, particularly the dosing valve and/or the dosing flange, with the dosing nozzle and electromagnet. The first heat exchanger part consists of a heat conductive material, particularly aluminum or copper. A second cylindrical or bowl-shaped heat exchanger part which is designed to fit flush with the outer periphery of the first heat exchanger part can be pushed onto the dosing unit and/or over the first heat exchanger part in order to define a helical fluid channel in connection with the spiral fins. The fluid channel is formed by the fin surface, the outer periphery of the hollow cylinder of the first heat exchanger part, and the inner wall of the hollow cylinder of the second heat exchanger part. The second heat exchanger part can be made of plastic or another easily moldable, cheap to produce, and heat-resistant material, for example. It can also be contemplated that the outer periphery of the dosing valve be configured with a spiral fin, that this is attached later to the same, for example by coiling around the same, welding, or attaching by means of fastening means, such that only one second heat exchanger part need be pushed over the dosing valve, with the fin profile, in order to create a heat exchanger. Due to the two-part construction, the fluid channel can be formed particularly during the assembly of the dosing valve, by simply sliding the second heat exchanger part over, wherein the connections to an air supply system can be arranged in the second heat exchanger part, by way of example.

As such, a heat exchanger part results which is cheap to produce, and can be used for various different, already extant dosing units, and which can also be retrofitted with no problem to existing engines.

According to a further advantageous embodiment of the invention, the first heat exchanger part consists of heat conductive material, particularly metal, and preferably of aluminum or cooper. Aluminum and/or copper have a very good electrical and also heat conductive property, and can therefore provide high cooling and/or heating capacity for a fluid to air heat exchanger.

According to a further advantageous embodiment of the invention, the second heat exchanger part can be screwed onto the first heat exchanger part, and can be made of a heat-resistant plastic. Due to a spiral-shaped profile of the spiral fin of the first heat exchanger part, it is logical for the second heat exchanger part to be designed in such a manner that it can be screwed onto the first heat exchanger part. For this purpose, the inner wall, in particular, of the second heat exchanger part can likewise have a spiral fin in order to thereby provide a screw function with respect to the first heat exchanger part.

According to a further advantageous embodiment of the invention, a funnel-shaped air inlet opening can be arranged on a first side of the heat exchanger opposite the outlet nozzle of the dosing valve—and preferably on the second heat exchanger part as well. The air inlet opening can be designed as a single piece together with the second heat exchanger part, by way of example, and the air inlet opening can preferably be oriented in the axial direction of the dosing valve. According to this embodiment, it is suggested that the air stream is conveyed axially from above—meaning from the side facing the valve nozzle—into the spiral-shaped fluid channels of the heat exchanger, such that it is possible for an air supply device to have easy access to the "cool side" of the dosing valve— thereby achieving a compact, axially-oriented feed of air. As such, it is possible to connect ambient outside air—for example vehicle air flow or air conditioner air—to supply cooled and/or heated air to the "cold side" of the dosing unit, and to blow air in the axial direction into the dosing unit and/or the dosing valve. This air is guided through the spiral profile of the fluid channels tangentially along the cylinder of the dosing valve, in order to cool and/or heat the dosing valve.

Flow does not arrive as the spiral fin tube from the side, as is conventional, but rather the feed and/or exhaust is realized in the axial direction of the dosing unit, and the air then flows in a tangential direction around the dosing unit. This results in a small constructed space and a high volume flow with low fluid volume in the heat exchanger.

According to a further advantageous embodiment of the invention, an air outlet space can be arranged on the outlet nozzle side of the dosing valve, on the outer periphery of the heat exchanger, running at least partially around the same. As such, this embodiment suggests that the air outlet can exit on the "hot side"—meaning on the outlet nozzle side—near to the exhaust gas stream, and disperses into the surroundings and/or additionally controls the temperature of a subregion of the exhaust gas line. No separate system is necessary to guide away the air, such that only the air in-feed need be included in the construction, and no air outlet need be included.

According to a further advantageous embodiment of the invention, the radial projection of the fin can be reduced at the start and/or at the end of the fluid channel, in order to provide an increased inflow and/or outflow volume for the temperature control air. As such, this embodiment suggests that the fin of the first heat exchanger part initially does not spread over the entire surface between the first and the second heat exchanger part, but rather narrows radially such that—on the one hand—it is easier for the second heat exchanger part to be screwed on, and—on the other hand—an increased volume of air can penetrate into the spiral fluid channels and exit from the same. In a single-piece design of the heat exchanger, the first and/or last spiral winding can be designed in such a manner that they do not fully extend between the inner and outer cylinder wall, such that the air can simultaneously enter distributed over multiple spiral windings. In this way, an increase in the volume flow and a reduction of turbulence are achieved. The air can enter through the air inlet opening, which is advantageously designed with a funnel shape and can receive a large airflow volume, sweep through the first fins, distributed equally among the same, and exit at the air outlet opening, which particularly comprises the entire periphery region of the lower end of the heat exchanger, through the last spiral winding and/or windings.

According to a further advantageous embodiment of the invention, the cooling wall of the heat exchanger which faces the outer wall of the dosing valve, said outer wall being cooled or heated, can be connected in a heat conductive manner to the dosing valve by means of a heat conductive material, particularly a graphite packing, a heat conductive paste, a metal granulate, or the like. As an alternative to a single-piece design of the outer wall of the dosing valve as a spiral fin cylinder, the inner wall of the heat exchanger can be coupled to the outer wall of the dosing valve by means of a heat conductive material. Particularly in the event of a dosing unit being retrofitted with a heat exchanger according to the invention, it is possible to provide a particularly good heat transmission between the air, the wall of the dosing valve, and the AUS fluid flowing inside the same, for example by attaching a graphite packing which has high heat conductivity and can easily fit the contours at the transition of an outer wall of the dosing valve to the inner wall of the heat exchanger cylinder. The inner hollow cylinder of the heat exchanger, intended to receive the dosing valve, can be significantly larger than the outer periphery of the valve, and in this way it is possible to provide heat exchangers for different dosing valve diameters. The heat exchanger can be easily installed as a result of the heat conductive coupling by means of a volume-filling material.

According to a further aspect of the invention, an SCR dosing unit is suggested which has a heat exchanger according to one of the previous embodiments. An air intake system is arranged on the dosing unit, such that hot air can be fed into the heat exchanger when the internal combustion engine is started in cold times of year, and cool air can be fed into the heat exchanger during engine operation. The volume of the air being conveyed, and/or the temperature thereof, preferably depends on the load at which the internal combustion engine is operating. As such, the temperature control air can be the airflow around a vehicle, for example, or air compressed by a fan, the air flow capacity of which varies according to the rotation speed of the internal combustion engine or the temperature of the exhaust gas. In addition, it can be contemplated that the cooling air is provided by an air conditioner which is driven by the internal combustion engine. The higher the rotation speed of the internal combustion engine is, the lower the temperature of the temperature control air can be, and/or the higher the air flow can be, and the better is the temperature control function. The air intake system can be an air channel system oriented in the direction of the front of the vehicle, which takes in airflow around the vehicle, or it can be a connection socket on an air conditioner, for the purpose of cooling, heating, and/or air conditioning the interior of a vehicle. No high demands for tight sealing of the air intake system are made. However, it can advantageously be contemplated that the air intake system conveys the air into a funnel-shaped air inlet space of the heat exchanger, in the direction which is axial to the dosing unit. Because the heat exchanger is suggested as a closed unit, it can be replaced if necessary by a heat exchanger which circulates liquid and has comparable outer dimensions. As such, a modular dosing unit is suggested, the heat exchanger of which can be designed if required as an air heat exchanger, or—for example if an internal combustion engine is used in a closed environment such as a mine, ship, factory building, or the like—as an oil or water heat exchanger. As such, the heat exchanger can be replaced or adapted as required, or in the event of a defect. This increases the options for deploying the heat exchanger, and the variability of the dosing unit. The heat exchanger in this case serves the purpose of cooling as well as heating/defrosting the dosing unit.

According to a further advantageous design of the dosing unit, the air intake system can have an air intake socket which is designed as a single piece together with the second heat exchanger part. The air intake socket can preferably convey air into a funnel-shaped air inlet opening, and enables a connection to an air intake system such that it is possible to convey a large volume of temperature control air into the heat exchanger.

According to a further advantageous design of the dosing unit, the air intake system can have a regulated air compressor, such that different volumes of temperature control air can be conveyed into the heat exchanger according to the operating state of the internal combustion engine. As a result of the arrangement of an air compressor, it is possible for different volumes of cooling and/or heating air to be conveyed into the dosing unit, for example according to the temperature of the exhaust gas stream and/or a rotation speed or a rotary torque of the internal combustion engine. The air compressor can be controlled via a temperature sensor inside the dosing unit, by way of example, and enables a regulated temperature control of the dosing unit.

In a further embodiment of the dosing unit, the air intake system can remove air from an air conditioner of a vehicle, because the same provides good cooling capacity particularly at higher outside temperatures and/or when the drive engine is under heavy load and the resulting exhaust gas stream temperature is high, such that in this manner it is possible to efficiently increase the cooling capacity for the dosing unit when the exhaust gas temperature is high.

In a final aspect according to the invention, an exhaust gas treatment device is suggested for an internal combustion engine, particularly for a vehicle engine, and preferably for a diesel engine, which has a dosing unit according to one of the previous embodiments.

Additional advantages are found in the following drawing description. Embodiments of the invention are found in the drawings. The drawings, the description, and the claims contain numerous features in combination. A person skilled in the art will also regard the features as practical individually, and arrange the same in further practicable combinations.

In the drawings:

FIG. 4 shows a cutaway and perspective view of a first embodiment of a dosing unit according to the invention;

In the figures, the same or similar components are indicated by the same reference numbers.

Figure 1:
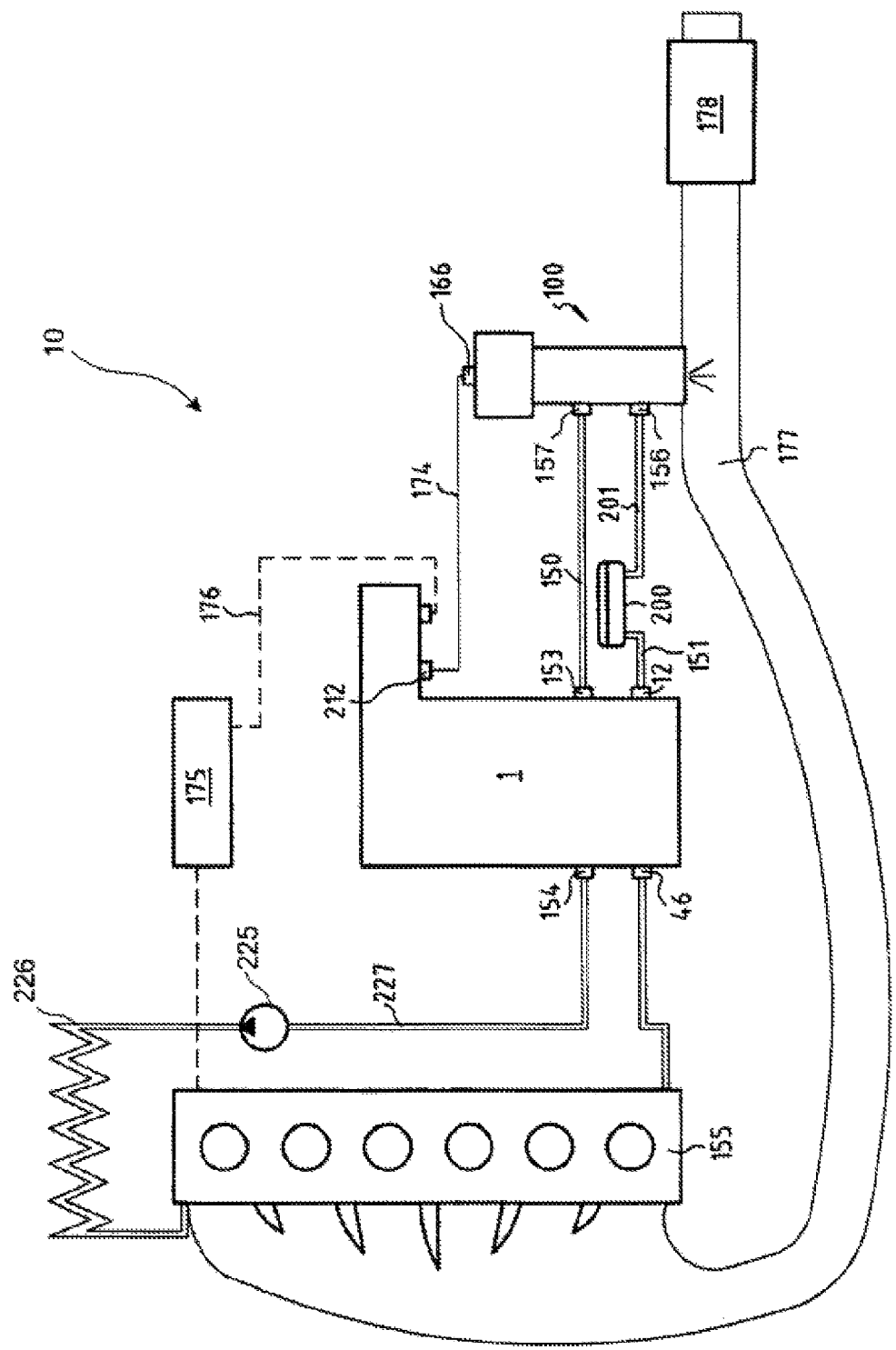
FIG. 1 shows a block diagram of an exhaust gas treatment device.

FIG. 1 shows a typical exhaust gas treatment device 10. The exhaust gas treatment device 10 has a pump unit 1, a dosing unit 100 for the dosed injection of AUS into an exhaust gas system 177 of an internal combustion engine 155 upstream of an SCR catalytic converter 178, and an AUS tank 200. All components of the exhaust gas treatment device 10 are designed in such a manner that freezing of the unpressurized AUS does not lead to damage.

The pump unit 1 receives control information via a signal line 176 from a control device 175, the same communicating with the engine controller of the motor vehicle drive engine 155. This signal line transmits CAN bus signals, among other signals, and increases the injection output of AUS when the exhaust gas output of an internal combustion engine 155 is increased.

The pump unit 1 removes AUS from an AUS tank 200 via an AUS suction connection 12, in order to pump the same to supply the dosing unit 100 during circulation operation. On the opposite side of the pump unit 1, there are two cooling water connections 46, 154. Cooling water is circulated through the two cooling water connections 46, 154 to cool the pump unit 1. The two cooling water connections 46, 154 are connected into the cooling water circulation 227 of a motor vehicle drive engine 155, and therefore the pump unit 1 can be defrosted and/or kept at elevated operating temperature by the hot cooling water of the cooling water circulation 227 of the motor vehicle drive engine 155. The cooling water circulation makes the cooling water flow through the engine block of the internal combustion engine 155 by means of a cooling water pump 225. The heat is released to the surrounding air and/or the air flow of the vehicle via an air to cooling water heat exchanger 226.

Figure 2:
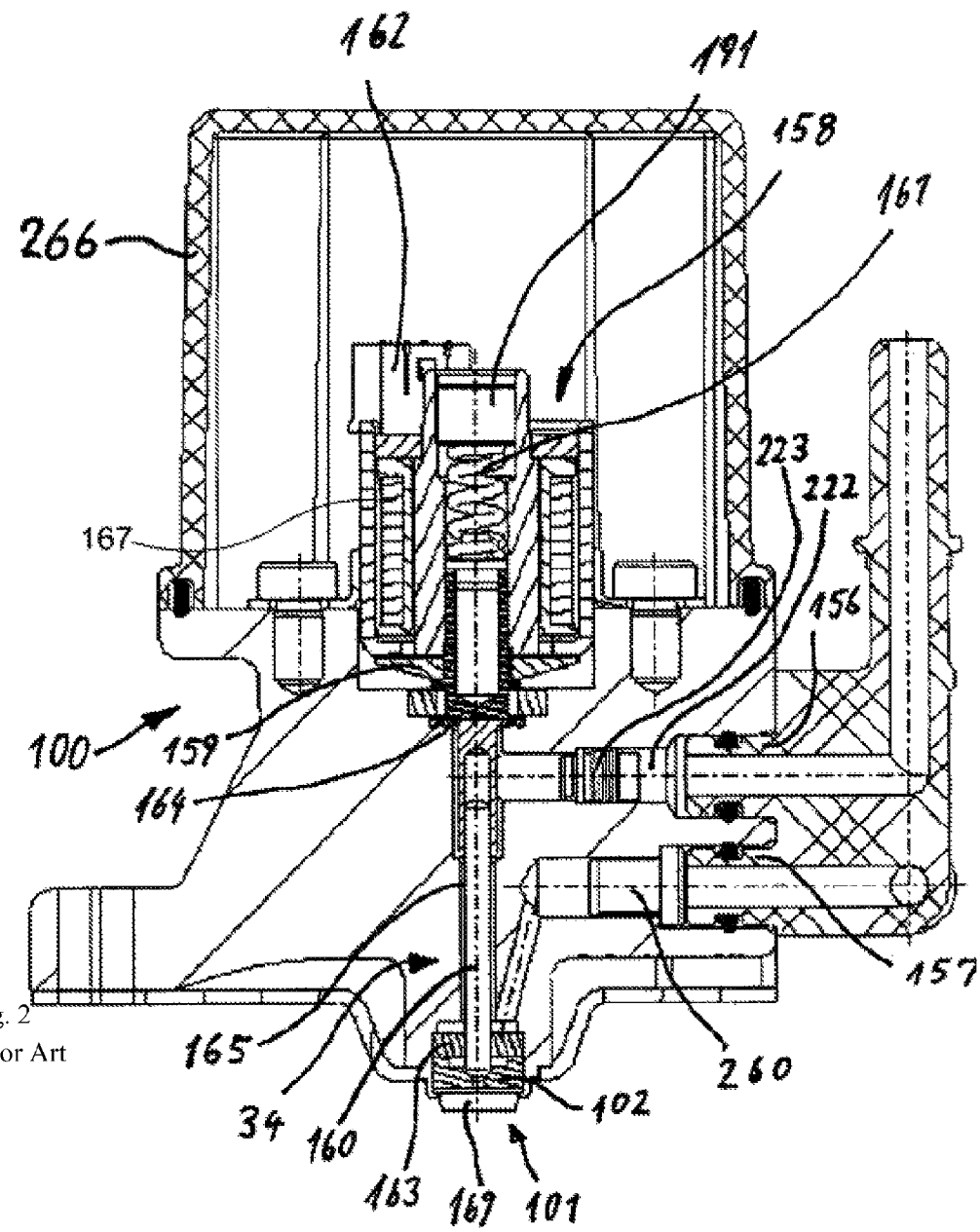
FIG. 2 shows a cutaway view of a dosing unit according to the prior art.

The pump unit 1 removes AUS from the tank 200 via the AUS intake connection 12, compresses the same, and discharges it to the dosing unit 100 via the AUS pressure connection 153. The AUS pressure connection 153 is connected to the feed connection 157 of the dosing unit 100 via the external AUS line 150. The AUS intake connection 12 of the pump unit 1 is connected to an AUS tank 200 via the AUS line 151, and the outlet connection 156 of the dosing unit 100 is connected to the AUS tank 200 via a further AUS line 201, such that there is a continuous circulation of the AUS over a return flow orifice 223 in the dosing unit 100, as shown in FIG. 2. A multi-pole contact plug 212 establishes the connection to the control unit 175, and to the voltage supply. Communication is established via CAN bus signals. The AUS is injected by a dosing valve 34 of the dosing unit 100, into a region of the exhaust gas system 177 which is upstream of a catalytic converter 178. The dosing unit 100 is connected to the pump unit 1 via a multi-pole contact plug 166, an electrical line 174, and the multi-pole contact plug 212.

The dosing unit 100 according to the prior art, shown in FIG. 2, comprises the electromagnetic dosing valve 34. This electromagnetic dosing valve 34 has an electromagnet 158 with an armature 159, which can compress a helical compression spring 161 acting opposite the spring force thereof, such that the AUS pressure can push a needle 160 into the open position. The helical compression spring 161 in this case is supported on a threaded bolt 191, by means of which the pretension of the helical compression spring 161 can be adjusted. If the electromagnet 158 does not receive electrical current via its connections 162, the helical compression spring 161 presses the needle 160 back against a valve seat 102, into a closed position. The needle 160 in this case is relatively long, and is guided on one end in a linear glide bearing 163. On the other end, the guidance is realized by means of a seal membrane 164 which protects the electromagnet 158 from the corrosive AUS. A cooling channel 165 is configured between these two guides, which closes the circulation between two dosing unit connectors 156, 157. A circulating stream of AUS flows through the cooling channel 165, cooling the dosing unit 100, which heats up as a result of the heat lost by the exhaust gas system. Dosing unit connectors 156, 157 are connected to the AUS lines 150, 201. The AUS is conveyed from the dosing unit connector 157, the same designed as a feed, past a filter screen 260, through multiple recesses in the frontal linear glide bearing 163, to the valve seat 102. If the AUS is allowed to pass through a central opening in the valve seat 102, when current is flowing to the electromagnet 158, then the AUS is conveyed through a vaporizing nozzle 101. This vaporizing nozzle 101 is designed as a swirl nozzle, and has two nozzle plates placed one over the other. These two nozzle plates are clamped against the valve seat 102 by means of a nozzle outlet insert 169. The nozzle outlet insert 169 has an outlet—which is not visible in greater detail—which widens with a funnel shape. The dosing unit 100 comprises the return feed orifice 223 in a return feed channel 222 upstream of the dosing unit connector 156. The continuous flow of AUS through the dosing unit 100 is ensured via this return feed orifice 223. As a result, first of all, the temperature of the dosing unit 100 is kept low. Secondly, when the current is switched off, the pressure in the exhaust gas treatment device drops to that of the tank, without energy being needed to open a valve for this purpose. The AUS can expand against the seal membrane 164 in the electromagnetic dosing valve 34.

The disadvantage of the design above is the cooling of the dosing valve 34 by the circulating AUS stream. The components which contact the AUS fluid, particularly the seals and lines, must be made of stainless steel or approved plastic, because the urea solution is highly reactive with metals and automotive paints. As such, even a small leak in the cooling system generates great damage, because AUS has a highly corrosive effect, such that the leak expands rapidly, AUS is lost, and the cooling of the dosing unit 100 halts. Therefore, there is a risk of overheating of the dosing unit 100, damage to the exhaust gas treatment device 10, and failure of the catalytic converter.

Figure 3:
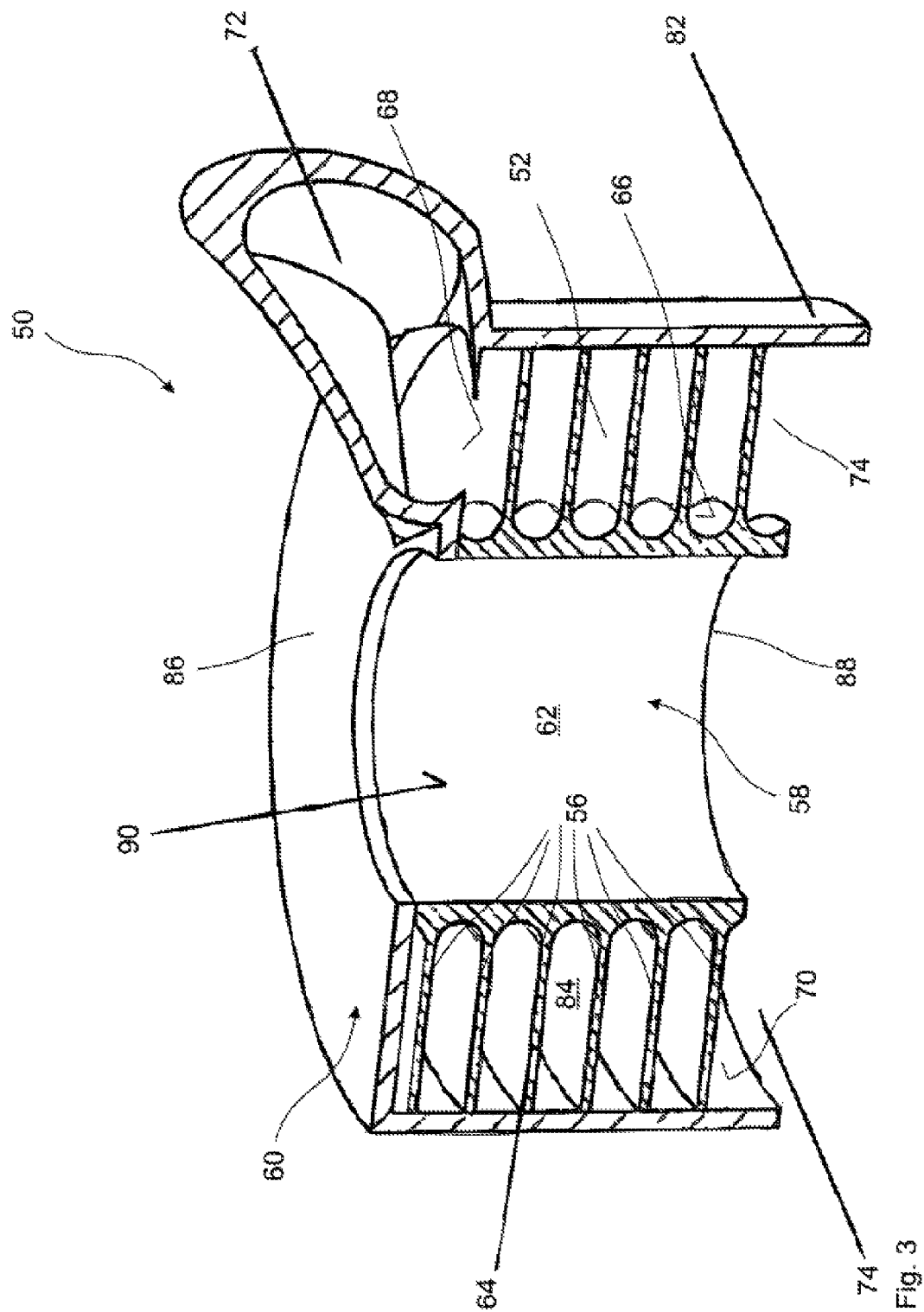
FIG. 3 shows a cutaway view of one embodiment of an air cooling element according to the invention.

One embodiment of a heat exchanger 50 is illustrated in FIG. 3, which consists of a first heat exchanger part 58 and a second heat exchanger part 60. The first heat exchanger part 58 is a hollow cylinder 62 which has spiral fins 64 which are routed around the outer periphery 66 of the hollow cylinder 62 in a helical shape, and are constructed as a single piece together with the same. The first heat exchanger part 58 is made of aluminum. A cooling effect is generated on its inner surface 90 when air flows through the fluid channels 84, such that it is possible to achieve a high dissipation of heat via the cooling air flow, over a heat conductive transition to an outer wall of a dosing unit (not illustrated). The second heat exchanger part 60 has a cylindrical and/or bowl-shaped design, and has an air inlet opening 72 which has a funnel-shaped design and extends axially to the orientation of the heat exchanger 50. The second heat exchanger part 60 can be pushed onto the outer periphery of the cooling fins 64 of the first heat exchanger part. In this manner, the inner wall 70 of the second heat exchanger part 60, the cooling fin surface 68, and the outer wall 66 of the hollow cylinder 62 of the first heat exchanger part define fluid channels 84. These are routed as windings 56 around the inner periphery of the hollow cylinder 62. An air outlet space 74 is defined opposite the air inlet opening 72 axially, through which the air can exit on the periphery of the heat exchanger 50.

As such, the heat exchanger 50 has a funnel-shaped air inlet opening 72 on the upper side 86 which is opposite a nozzle outlet side 101 of a dosing unit 100. And on the lower side of the heat exchanger 88, which lies on the nozzle outlet side 101 and/or the exhaust gas system 177 of an internal combustion engine 155, the heat exchanger 50 comprises an air outlet space 74 which includes the entire periphery of the bowl-shaped heat exchanger 50. The cylindrical inner surface 90 of the first heat exchanger part can be connected in a heat conductive manner with the outer wall of the dosing unit 100 and/or the dosing valve 34 by a graphite packing. The cylinder outer shell 82 of the second heat exchanger part 60 surrounds the dosing cylinder, and can be arranged inside a further housing 266 of the dosing unit 100. The cooling air flows axially into the funnel-shaped inlet space 72 of the second heat exchanger part 60, flows in a spiral around the outer periphery of the dosing unit 100, and exits on the lower side 88, in the air outlet space 74, on the entire peripheral region of the heat exchanger 50.

A further embodiment of a dosing unit 100 is illustrated in FIG. 4—in a cutaway view in FIG. 4a, and a perspective view in FIG. 4b—and has a heat exchanger 50. The dosing unit 100 has an AUS dosing unit connector 156, through which AUS is supplied to the dosing valve 34. The dosing valve 34 has an electromagnet 158 and a dosing mechanism, which is not illustrated and which is positioned in a cylinder, the outer periphery 54 of which is being cooled. The vaporizing nozzle 101 of the dosing unit 100 discharges AUS into an exhaust gas system 177. The dosing unit 100 is surrounded by a second heat exchanger part 60 as a housing, which has an air intake socket 80 of an otherwise not-illustrated air intake system 78 on its upper axial end. The end of a ventilator fan can be connected to this air intake socket 80, in order to convey cooling air into the second heat exchanger part 60 and therefore into the dosing valve 100. The outer periphery 54 of the dosing valve is surrounded by a first heat exchanger part 58, which has a funnel-shaped air inlet opening 72 which is open toward the dosing unit 100 axially, and therefore to the air intake socket 80. The first heat exchanger part 58 has spiral cooling fins 64 which narrow in the axial upper and lower ends in order to enable an air inflow and/or outflow which is free of turbulence and has a large volume. The inner wall of the hollow cylinder of the first heat exchanger part 58 is connected to the outer wall 54 of the dosing valve via a graphite packing 92 as a heat conductive material. The electromagnet 158 also has an electrical connector 162, as well as a line 268 for a temperature sensor which can be used to control the airflow volume.

Figure 5A:
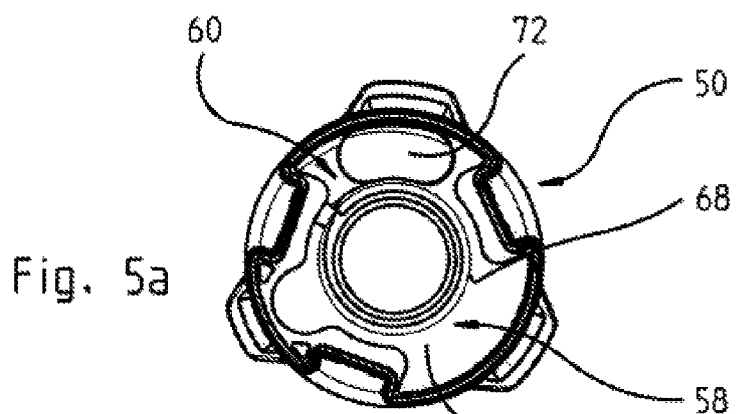
FIG. 5 shows various perspective views of a further embodiment of an air cooling element according to the invention.
Figure 5B:
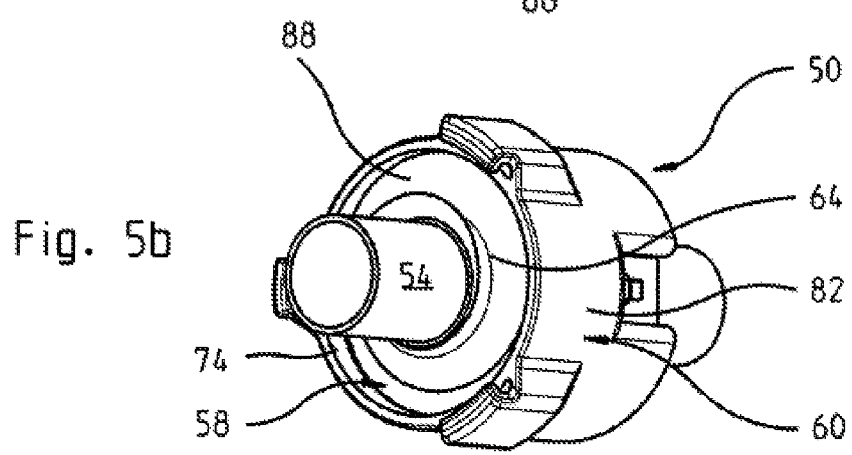
Figure 5C:
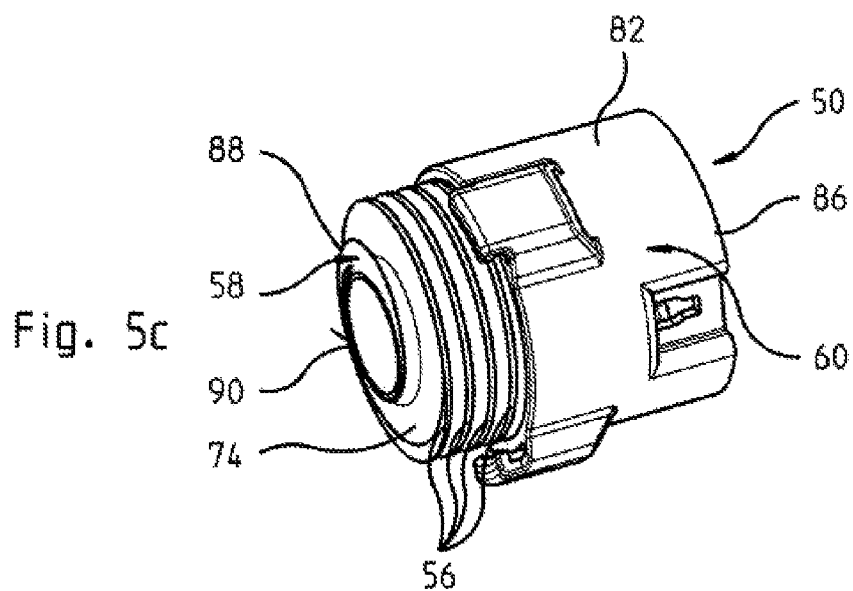

In the various perspective drawings in FIG. 5, a further embodiment of a heat exchanger 50 is illustrated. The heat exchanger 50 consists of a spiral fin tube 58 as the first heat exchanger part, which has a hollow cylinder 62, around which spiral cooling fins 64 run along the outer wall 66 thereof. The cooling fins 64 are reduced in their radial projection on both axial ends, in order to ensure the most turbulence-free air inflow and/or outflow possible. The first heat exchanger part 58, consisting of aluminum, is surrounded by a second bowl-shaped heat exchanger part 60 made of plastic. The second heat exchanger part 60 has plastic fins, which are not visible, on its inner wall, which can be screwed into the helical shaped cooling fins 64 of the first heat exchanger part. The second heat exchanger part 60 has an air inlet opening 72 on an upper side 86 thereof, said air inlet opening 72 having a funnel-shaped design, wherein cooling air can flow through the same into the fluid channels 52. The fluid channels 52 are formed by the cooling fin surface 68, the outer periphery of the hollow cylinder 62 of the first heat exchanger part 58, and the inner periphery 70 of the second heat exchanger part 60. The air inlet opening 72 is arranged on the air inlet side 86. On the lower side of the heat exchanger 88, which is functionally assigned to the nozzle outlet side 101 of a dosing valve 100, the air can exit the spiral cooling fin profile 52 on the entire periphery. A view of the upper side 86 of the heat exchanger 50 is shown in FIG. 5a. FIG. 5b shows a view of the lower side 88, on which air can exit through the air outlet space 74. FIG. 5c shows the first and second heat exchanger parts 58, 60 half-screwed into each other. The windings 56 are clearly visible. The cylinder shell 82 of the second heat exchanger part is molded in such a manner that it can be accommodated in a housing of the dosing unit, and the inner diameter of the hollow cylinder 62 of the first heat exchanger part 58 is sized in such a manner that it surrounds the dosing valve 100 along with the electromagnet 158. For a heat coupling function, a heat conductive material can be inserted between the inner wall 62 of the hollow cylinder 62 and the outer wall 54 of the dosing valve 100. Heat conductive paste or a graphite packing is suitable for this purpose.

The exhaust gas treatment device as illustrated can particularly be used in heavy commercial vehicles which are most commonly equipped with a diesel engine. In diesel engines, the reduction of NOx is particularly necessary. Also, the constructed space conditions, and accelerations, in such a heavy commercial vehicle are such that the arrangement of a dosing unit which is heavy and which is relatively large as a result of the electromagnet 158 is reasonable. However, the invention can also be used in small passenger vehicles. In addition, the invention can also be used in gasoline engines.

LIST OF REFERENCE NUMBERS 1 pump unit
10 exhaust gas treatment device
12 AUS suction connection
34 dosing valve
46 cooling water connection—inlet
50 heat exchanger 52 fluid channel
54 outer peripheral wall of the dosing valve
56 winding of the fluid channel
58 first heat exchanger part
60 second heat exchanger part
62 hollow cylinder
64 heat exchanger fin
66 outer cylinder surface of the first heat exchanger part
68 fin surface
70 inner surface of the second heat exchanger part
72 air inlet opening
74 air outlet region
76 heat conductive flexible material
78 air intake system
80 air intake socket
82 cylinder shell of the second heat exchanger part
84 fluid channel volume
86 upper side of the heat exchanger—air inlet side
88 lower side of the heat exchanger—air outlet side
90 inner cylinder surface of the first heat exchanger part—heat exchanger wall
92 heat conductive material
100 dosing unit
101 vaporizer nozzle—swirl nozzle
102 valve seat
150 AUS connection line
151 AUS connection line
153 AUS pressure connection
154 cooling water connection—outlet
155 internal combustion engine
156 AUS dosing unit connection—outlet
157 AUS dosing unit connection—feed
158 electromagnet
159 armature
160 valve needle
161 coil spring
162 electromagnet connection
163 linear glide bearing
164 seal membrane
165 cooling channel
166 contact plug
167 magnet coil
169 outlet nozzle insert
174 electrical control/supply line
175 control device
176 CAN bus—control line
177 exhaust gas system
178 catalytic converter
191 threaded bolt
200 AUS tank
201 AUS connection line
212 contact plug
222 return flow channel
223 return flow orifice
225 cooling water pump
226 air to cooling water heat exchanger
227 cooling water line
260 filter screen
266 lid
268 temperature sensor connection line

The invention claimed is:

1. A heat exchanger for a dosing unit of an SCR (selective catalytic reduction) exhaust gas treatment device, wherein the dosing unit is structured to discharge an adjustable volume of fluid into an exhaust gas system of an internal combustion engine, and wherein the heat exchanger has at least one air flow channel directing a flow of air, and said channel is routed around at least a subregion of an outer peripheral wall of a dosing valve of the dosing unit, wherein the channel defines a helical flow path including a flow directing heat transfer surface winding around the outer peripheral side wall of the dosing valve.

2. A heat exchanger according to claim 1, wherein the helical flow path has three or more windings.

3. A heat exchanger according to claim 1, wherein the heat exchanger is designed as a multi-part component, with at least two parts, wherein a first inner heat exchanger part has a heat conductive hollow cylinder for receiving the region of the dosing unit being one or both of cooled and heated, and a heat conductive fin, which is routed as a spiral fin, with a helical shape, around the outer shell of the hollow cylinder, projecting radially from the same, and a second external, bowl-shaped heat exchanger part is pushed onto or screwed onto the outer periphery of the fin of the first heat exchanger part with a flush fit for the purpose of defining an outer wall of the channel, such that the volume between the fin surface and the outer cylinder surface of the first heat exchanger part and the inner surface of the second heat exchanger part defines the channel.

4. A heat exchanger according to claim 3, wherein the first heat exchanger part is made of metal, particularly aluminum or copper.

5. A heat exchanger according to claim 3, wherein the second heat exchanger part is screwed onto the first heat exchanger part, and is made of heat-resistant plastic.

6. A heat exchanger according to claim 1, wherein a funnel-shaped air inlet opening is arranged on a first side opposite the outlet nozzle of the dosing valve, and is arranged on a second heat exchanger part, particularly as a single piece, wherein the air inlet opening is particularly oriented along the axial direction of the dosing valve.

7. A heat exchanger according to claim 1, wherein an air outlet space, which runs at least partially around the outer periphery of the heat exchanger, is arranged on the outlet nozzle side of the dosing valve.

8. A heat exchanger according to claim 3, wherein the protrusion of the fin radially is reduced at one or both of the start and the end of the channel in order to provide one or both of an increased inlet and outlet flow volume of air.

9. A heat exchanger according to claim 1, wherein the heat transmission wall of the heat exchanger facing the outer wall of the dosing valve, said outer wall being one or both of cooled and/or heated, has a heat conductive connection with the dosing valve by means of a heat conductive material, particularly a graphite packing, a heat conductive paste, a metal granulate, or the like.

10. An SCR dosing unit having a heat exchanger according to claim 1, wherein an air intake system is arranged on the dosing unit, and is designed to direct air into the heat exchanger during operation of the internal combustion engine.

11. A dosing unit according to claim 10, wherein the heat exchanger is designed as a multi-part component, with at least two parts, wherein a first inner heat exchanger part has a heat conductive hollow cylinder for receiving the region of the dosing unit being cooled or heated, and a heat conductive fin, which is routed as a spiral fin, with a helical shape, around the outer shell of the hollow cylinder, projecting radially from the same, and a second external, bowl-shaped heat exchanger part is pushed onto or screwed onto the outer periphery of the fin of the first heat exchanger part with a flush fit for the purpose of defining an outer wall of the channel, such that the volume between the fin surface and the outer cylinder surface of the first heat exchanger part and the inner surface of the second heat exchanger part defines the channel, and wherein the air intake system has an air intake socket which is designed as a single piece together with the second heat exchanger part.

12. A dosing unit according to claim 10, wherein the air intake system has a regulated air compressor in order to direct different volumes of air into the heat exchanger according to the operating state of the internal combustion engine.

13. A dosing unit according to claim 10, wherein the air intake system can is structured to remove air from an air conditioner system of a vehicle.

14. A dosing unit according to claim 10, wherein the dosing unit is operative coupled with an exhaust gas treatment device for an internal combustion of a vehicle.

15. An apparatus comprising: a heat exchanger for an exhaust aftertreatment reductant dosing unit structured to discharge a reducing agent into an exhaust gas conduit in exhaust flow communication with an engine, the heat exchanger including an air flow channel leading from an inlet in flow communication with an air supply to an outlet in flow communication with the exhaust gas conduit, the air flow channel winding helically around at least portion of a dosing valve of the dosing unit, wherein the heat exchanger is structured as a multi-part component including a first inner heat exchanger part including heat conductive hollow member receiving the portion of the dosing valve and defining a perimeter of the air flow channel.

16. An apparatus according to claim 15, wherein the first inner heat exchanger part includes a heat conductive fin projecting radially outward from the hollow member and defining a surface of the helically winding air flow channel.

17. An apparatus according to claim 16, wherein the heat exchanger includes a second external heat exchanger part defining an outer wall of the fluid channel such that the volume enclosed by the fin, an outer surface of the first heat exchanger part and an inner surface of the second heat exchanger part defines the fluid channel.

18. An apparatus according to claim 17 wherein the second heat exchanger part is pushed onto or screwed onto the outer periphery of the fin of the first heat exchanger part.

19. An apparatus according to claim 16, wherein the radial protrusion of the fin is reduced at one or both of the start and the end of the fluid channel in order to provide one or both of an increased inlet and outlet flow volume of air.

20. An apparatus according to claim 15 wherein the helically winding air flow channel has a substantially constant inner diameter about the portion of the dosing valve.

* * * * *